US009872129B2

(12) United States Patent
Goto

(10) Patent No.: US 9,872,129 B2
(45) Date of Patent: Jan. 16, 2018

(54) COMMUNICATION APPARATUS, METHOD FOR CONTROLLING THE SAME, AND STORAGE MEDIUM

(71) Applicant: CANON KABUSHIKI KAISHA, Tokyo (JP)

(72) Inventor: Fumihide Goto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/170,093

(22) Filed: Jun. 1, 2016

(65) Prior Publication Data

US 2016/0360349 A1 Dec. 8, 2016

(30) Foreign Application Priority Data

Jun. 4, 2015 (JP) ................... 2015-114156

(51) Int. Cl.
| | | |
|---|---|---|
| H04B 7/00 | (2006.01) |
| H04W 4/00 | (2009.01) |
| H04W 48/16 | (2009.01) |
| H04W 76/02 | (2009.01) |
| H04W 84/12 | (2009.01) |

(52) U.S. Cl.
CPC ........... *H04W 4/008* (2013.01); *H04W 48/16* (2013.01); *H04W 76/026* (2013.01); *H04W 84/12* (2013.01)

(58) Field of Classification Search
CPC .... H04W 4/008; H04W 48/16; H04W 76/026
USPC ...................... 455/41.1, 41.2, 41.3
See application file for complete search history.

(56) References Cited

U.S. PATENT DOCUMENTS

| | | | |
|---|---|---|---|
| 8,918,500 B2 | 12/2014 | Goto | |
| 8,949,386 B2 | 2/2015 | Goto | |
| 9,088,860 B2 | 7/2015 | Sakai et al. | |
| 9,125,237 B2 | 9/2015 | Goto et al. | |
| 9,271,312 B2 | 2/2016 | Goto | |
| 2003/0036386 A1* | 2/2003 | Harrison ............... H04W 84/20 |
| | | | 455/438 |
| 2007/0275746 A1* | 11/2007 | Bitran ............... H04W 72/0446 |
| | | | 455/509 |

(Continued)

FOREIGN PATENT DOCUMENTS

| | | |
|---|---|---|
| JP | 2005-295574 A | 10/2005 |
| JP | 2007-166538 A | 6/2007 |

*Primary Examiner* — Md Talukder
(74) *Attorney, Agent, or Firm* — Carter, DeLuca, Farrell & Schmidt, LLP

(57) ABSTRACT

A communication apparatus starts short distance wireless communication with another communication apparatus while joining a wireless LAN created by an external access point (AP) as a station, determines whether the communication apparatus can concurrently perform a station function and an AP function of the wireless LAN in accordance with the start of the short distance wireless communication, directly connects to the other communication apparatus by the wireless LAN by disconnecting from the external AP when it is not determined that the station function and the AP function can be concurrently performed, reconnects to the external AP as the station when the direct connection fails, and directly connects to the other communication apparatus by the wireless LAN without disconnecting from the external AP when it is determined that the station function and the AP function can be performed concurrently.

9 Claims, 12 Drawing Sheets

(56) References Cited

U.S. PATENT DOCUMENTS

| | | | | |
|---|---|---|---|---|
| 2009/0129272 A1* | 5/2009 | Padfield | ................ | H04L 1/0002 370/235 |
| 2012/0134309 A1* | 5/2012 | Sakai | ................ | H04W 52/0206 370/311 |
| 2014/0240776 A1* | 8/2014 | Suzuki | .................. | G06F 3/1296 358/1.15 |
| 2014/0362771 A1* | 12/2014 | Kim | ...................... | H04W 48/16 370/328 |
| 2015/0016417 A1* | 1/2015 | Dees | .................... | G06F 1/1698 370/331 |
| 2015/0031376 A1* | 1/2015 | Liu | ....................... | H04W 24/02 455/450 |
| 2015/0117340 A1* | 4/2015 | Kawakami | .............. | G06F 21/85 370/329 |
| 2015/0305082 A1* | 10/2015 | Elliott | .................. | H04W 48/20 370/329 |
| 2016/0014680 A1* | 1/2016 | Jang | ..................... | H04W 48/02 370/338 |
| 2016/0360349 A1* | 12/2016 | Goto | .................... | H04W 4/008 |

\* cited by examiner

COMMUNICATION APPARATUS, METHOD FOR CONTROLLING THE SAME, AND STORAGE MEDIUM

BACKGROUND OF THE INVENTION

Field of the Invention

The present invention relates to a communication technique in a communication apparatus complying with a plurality of communication schemes.

Description of the Related Art

In recent years, a technique of handover between communication schemes different from each other which communicates by automatically switching between two communication functions complying with the communication schemes is used. For example, a communication apparatus transfers information for performing the setting of the second communication scheme by using the first communication scheme and automatically executes the setting of the second communication scheme by using that information. Note that the first communication scheme is, for example, infrared communication or NFC (Near Field Communication) and the second communication scheme is, for example, a wireless LAN or Bluetooth® (see Japanese Patent Laid-Open Nos. 2005-295574 and 2007-166538).

Even if the setting of the second communication scheme has been performed by using the first communication scheme, communication cannot be finally performed in a case in which, for example, a function itself of the second communication scheme is OFF. That is, for example, in a case in which a wireless LAN function is OFF in a communication partner apparatus when the second communication scheme is the wireless LAN, it is impossible to finally communicate with the partner apparatus by the wireless LAN even if the communication apparatus performs the setting of the wireless LAN. In such a case, however, there exists no method for coping with what kind of processing should be performed by the communication apparatus.

SUMMARY OF THE INVENTION

The present invention performs appropriate communication setting in accordance with the state of a partner apparatus.

According to one aspect of the present invention, there is provided a communication apparatus comprising: a first communication unit configured to perform short distance wireless communication; a second communication unit configured to perform communication of a wireless LAN; a start unit configured to start the short distance wireless communication with another communication apparatus by the first communication unit while the second communication unit is joining a wireless LAN created by an external access point as a station of the wireless LAN; a determination unit configured to determine whether the communication apparatus can concurrently perform a station function and an access point function of the wireless LAN in accordance with a start of the short distance wireless communication by the start unit; a first connection unit configured to directly connect to the other communication apparatus by the wireless LAN by disconnecting from the external access point when the determination unit does not determine that the station function and the access point function can be concurrently performed; a reconnection unit configured to reconnect to the external access point as the station of the wireless LAN when a connection by the first connection unit fails; and a second connection unit configured to directly connect to the other communication apparatus by the wireless LAN without disconnecting from the external access point when the determination unit determines that the station function and the access point function can be concurrently performed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment (Arrangement of Wireless Communication System)

Figure 1:
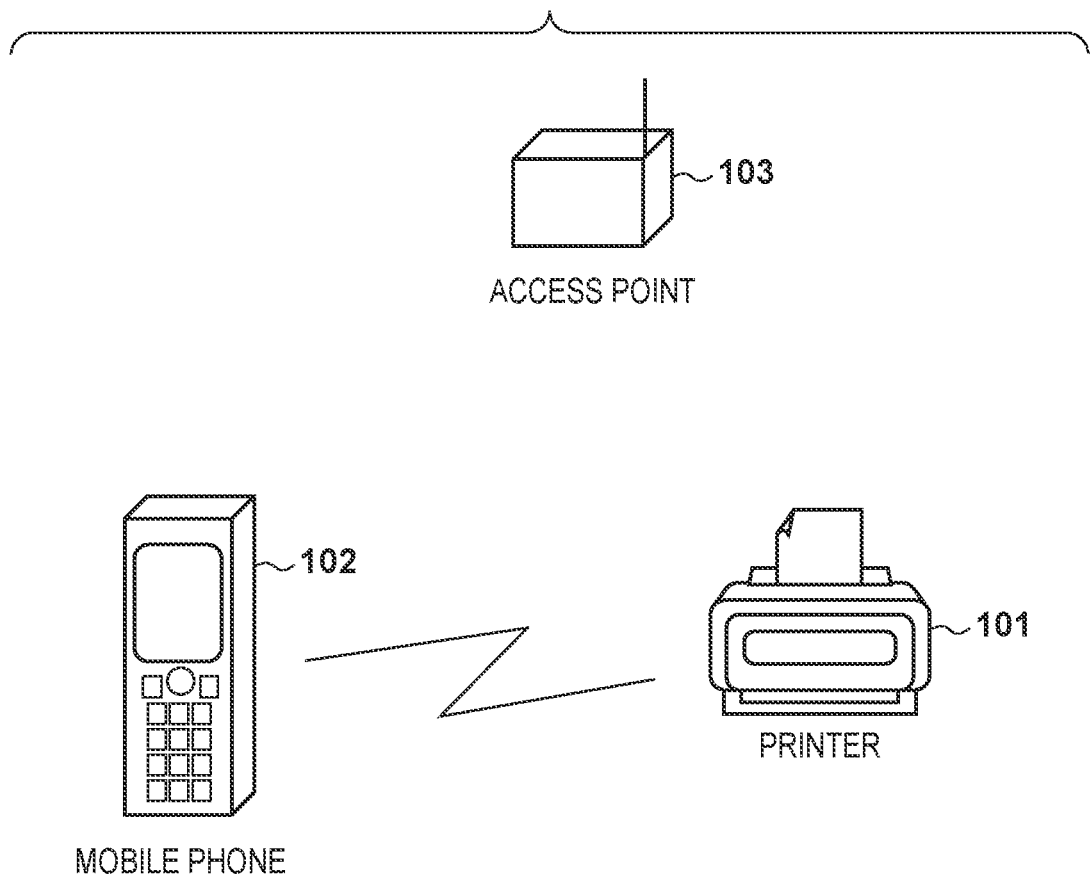
FIG. 1 is a view showing an example of the arrangement of a wireless communication system.

FIG. 1 shows an example of the arrangement of a wireless communication system according to this embodiment. The wireless communication system includes, for example, a printer 101, a mobile phone 102, and an access point 103. Note that both of the printer 101 and the mobile phone 102 function as communication apparatuses to be described later. The printer 101 and the mobile phone 102 can communicate by using the first communication scheme according to, for example, Near Field Communication (NFC) and the second communication scheme according to, for example, a wireless LAN complying with the IEEE802.11 standard series. Note that the first communication scheme and the second communication scheme are not limited to the communication schemes according to NFC and the wireless LAN, but may be a communication scheme related to another communication standard or the like. Triggered by NFC communication, the printer 101 and the mobile phone 102 can perform communication setting by the wireless LAN and can execute handover between the communication schemes from NFC to the wireless LAN. Note that the access point 103 may also have the same function. At least one of the printer 101 and the mobile phone 102 suffices to be able to perform processing to be described below. One of the printer 101 and the mobile phone 102 may only have a general function of making the handover between the communication schemes executable. The wireless communication system may also include a communication apparatus other than three apparatuses shown in FIG. 1. Note that the printer or the mobile phone is merely an example of the communication apparatus. The communication apparatus may be a PC, a digital camera, a smart device, or the like.

In a description below, the access point 103 creates a wireless LAN network (infrastructure network), the printer 101 joins that network as a station, and the mobile phone 102 does not join that network. Furthermore, in the description below, the mobile phone 102 attempts to newly connect to the printer 101 wirelessly and transmit held data to the printer 101 for printing.

In this embodiment, the mobile phone 102 is made to come close to the printer 101, thereby providing, via NFC, the printer 101 with setting information for communication between the printer 101 and the mobile phone 102 by using the wireless LAN. Then, the printer 101 can perform the setting of the wireless LAN based on that information, and establish, by that setting, a connection with the mobile phone 102 in the wireless LAN.

Note that there can be a case in which, for example, a wireless LAN function of the mobile phone 102 is OFF. For example, a user of the mobile phone 102 can turn off the wireless LAN manually in order to prevent battery consumption caused by searching for a surrounding wireless LAN unnecessarily. Further, there can be a case in which a wireless LAN connection cannot be established when the user unintentionally moves the mobile phone 102 closer to the printer 101 or when a deficiency occurs in the write contents of an NFC tag by an insufficient approaching time or the like. In this state, the printer 101 cannot finally communicate with the mobile phone 102 by the wireless LAN even if the setting of the connection to the mobile phone 102 by the wireless LAN has been performed. Conventionally, a study of what kind of processing should be performed in such a case has not been made.

In this embodiment, considering this background, the printer 101 determines, in accordance with the fact that it has communicated with the mobile phone 102 by using NFC, whether it is possible to communicate with the mobile phone 102 by the wireless LAN. If the determination result indicates that it is impossible to communicate with the mobile phone 102 by the wireless LAN, then the printer 101 does not perform the setting of the connection to the mobile phone 102 or in case of after the setting, the printer 101 performs a process of automatically returning to a setting before that setting. Similarly, the mobile phone 102 determines, in accordance with the fact that it has communicated with the printer 101 by using NFC, whether it is possible to communicate with the printer 101 by the wireless LAN. If the determination result indicates that it is impossible to communicate with the printer 101 by the wireless LAN, then the mobile phone 102 does not perform the setting of a connection to the printer 101 or in case of after the setting, the mobile phone 102 performs a process of automatically returning to a setting before that setting.

The arrangement and the processing sequence of an apparatus which performs such processing will be described in detail below.

(Apparatus Arrangement)

Figure 2:
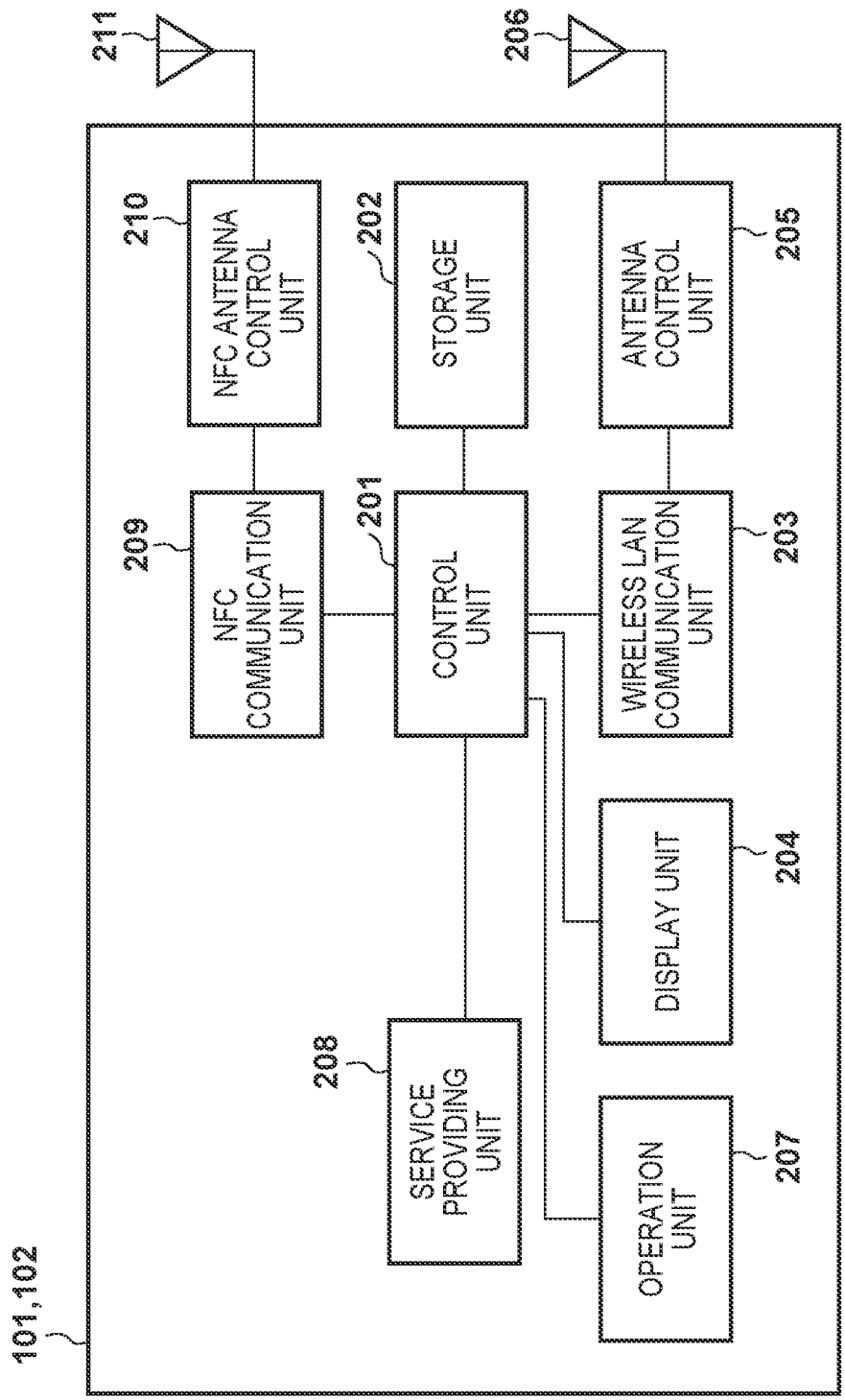
FIG. 2 is a block diagram showing an example of the hardware arrangement of a communication apparatus.

FIG. 2 shows an example of the hardware arrangement of a communication apparatus according to this embodiment. This communication apparatus is included in at least one of the printer 101 and the mobile phone 102, and may also be included in the access point 103. For example, the communication apparatus includes a control unit 201, a storage unit 202, a display unit 204, an operation unit 207, and a service providing unit 208, and has a wireless LAN communication function and an NFC communication function. The wireless LAN communication function includes, for example, a wireless LAN communication unit 203, a wireless LAN antenna control unit 205, and a wireless LAN antenna 206. The NFC communication function includes, for example, an NFC communication unit 209, an NFC antenna control unit 210, and an NFC antenna 211.

The communication apparatus uses, as a communication scheme, communication schemes of Near Field Communication (NFC) and the wireless LAN complying with the IEEE802.11 standard series. However, the communication apparatus may use a communication scheme other than these. For example, a wireless LAN complying with a standard other than the IEEE802.11 standard series may be used instead of the wireless LAN complying with the IEEE802.11 standard series. Further, infrared communication or the like may be used instead of NFC. Furthermore, in the wireless LAN complying with the IEEE802.11 standard series, communication in a direct communication mode such as Wi-Fi Direct® can be performed besides communication in an infrastructure mode via the access point 103.

For example, the control unit 201 controls the entire communication apparatus by executing control programs stored in the storage unit 202. The control unit 201 includes one or a plurality of processors such as CPUs or MPUs. Further, the control unit 201 can even control the setting of communication parameters with another communication apparatus. The storage unit 202 stores various kinds of information such as at least one of the various control programs and communication parameters executed by the control unit 201. The storage unit 202 can also store image data, a file, or the like generated in the communication apparatus or received from an external apparatus. The storage unit 202 can be formed by, for example, an arbitrary medium such as a ROM (Read Only Memory), a RAM (Random Access Memory), an HDD (Hard Disk Drive), or a flash memory. Note that various operations of the communication apparatus to be described later can be performed by causing the control unit 201 to execute the control programs stored in the storage unit 202 or, in some cases, may be performed by dedicated hardware suitable for those operations.

The display unit 204 has at least one of a function of outputting visually perceivable information like an LCD or an LED and a function of outputting aurally perceivable information like a loudspeaker, and performs various display operations by this function. The operation unit 207 is formed by, for example, various buttons or a touch panel and accepts operations made by various inputs by the user. The service providing unit 208 provides various services of an application level included in the communication apparatus. For example, when the communication apparatus is a printer, the service providing unit 208 is a printing unit, provides a printing function, and performs various kinds of control for it. Further, for example, when the communication apparatus is a digital camera, the service providing unit 208 is an image capturing unit, provides an image capturing function, and performs various kinds of control for it. Note that when the communication apparatus provides a plurality of services, one service providing unit 208 may operate to provide the plurality of services or one communication apparatus may include the plurality of service providing units 208 each providing at least one service.

The wireless LAN communication unit 203 performs wireless LAN communication complying with the IEEE802.11 standard series. The wireless LAN communication unit 203 can transmit or receive a signal for the wireless LAN by causing the wireless LAN antenna control unit 205 to control the wireless LAN antenna 206.

The NFC communication unit 209 performs short distance wireless communication complying with a Near Field Communication (NFC) standard. In NFC, an NFC tag and an NFC reader/writer are included as NFC roles. However, the NFC communication unit 209 can operate with playing either role. The NFC communication unit 209 can transmit or receive a signal for NFC by causing the NFC antenna control unit 210 to control the NFC antenna 211.

Note that the communication apparatus may further include a component other than the respective components described above or may not include any of the components out of the respective components described above. For example, the communication apparatus may not include the display unit 204 and may have a communication function by a cellular communication scheme when, for example, the communication apparatus is the mobile phone.

Figure 3:
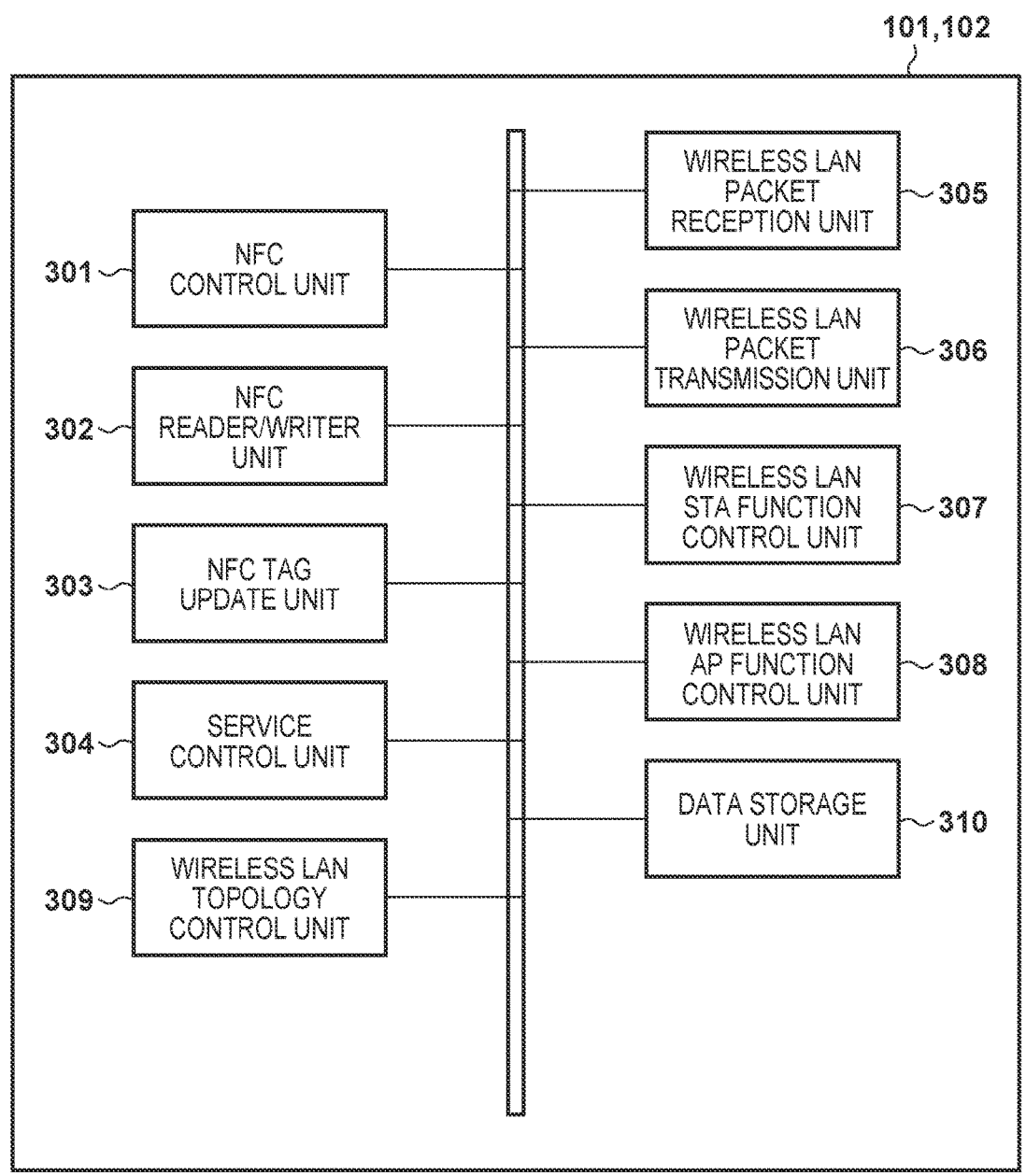
FIG. 3 is a block diagram showing an example of the functional arrangement of the communication apparatus.

The functional arrangement of the communication apparatus according to this embodiment will now be described with reference to FIG. 3. For example, as its functional arrangement, the communication apparatus has an NFC related function and a wireless LAN related function, and includes a service control unit 304 and a data storage unit 310. The NFC related function includes, for example, an NFC control function 301, an NFC reader/writer unit 302, and an NFC tag update unit 303. The wireless LAN related function includes, for example, a wireless LAN packet reception unit 305, a wireless LAN packet transmission unit 306, a wireless LAN STA function control unit 307, a wireless LAN AP function control unit 308, and a wireless LAN topology control unit 309.

The NFC control function 301 controls various NFC functions based on NFC forum specifications. In NFC, the NFC tag and the NFC reader/writer exist as NFC roles. However, the NFC control function 301 can even control either role. Based on an NFC communication standard, the NFC reader/writer unit 302 obtains information by reading it from a partner apparatus which plays the role of the NFC tag or writes that information. The NFC tag update unit 303 performs a process of writing contents obtained by reading them using the NFC reader/writer unit 302 in the NFC tag of a self apparatus.

Each of the wireless LAN packet reception unit 305 and the wireless LAN packet transmission unit 306 performs reception/transmission of a signal from/to the partner apparatus in the wireless LAN complying with the IEEE802.11 standard series. The wireless LAN STA function control unit 307 provides an STA (station) function defined in the IEEE802.11 standard series. The wireless LAN STA function control unit 307 performs, for example, authentication/encryption processing when the self apparatus operates as the STA of the wireless LAN. The wireless LAN AP function control unit 308 provides an AP (Access Point) function defined in the IEEE802.11 standard series. The wireless LAN AP function control unit 308 performs, for example, authentication/encryption processing when the self apparatus operates as the AP of the wireless LAN and management of the communication partner apparatus. Only one of the wireless LAN STA function control unit 307 and the wireless LAN AP function control unit 308 may operate at certain time or both of them may operate concurrently. The wireless LAN topology control unit 309 controls the arrangement of the wireless LAN by controlling the wireless LAN STA function control unit 307 and the wireless LAN AP function control unit 308.

The service control unit 304 controls a service in an application layer. The application layer here indicates a service providing layer in an upper layer of the fifth or higher layer in an OSI reference model. That is, the service control unit 304 performs control for providing the printing function, an image streaming function, a file transfer function, or the like. The data storage unit 310 can store and hold software itself, and a wireless LAN parameter and various tables such as a DHCP address table and an ARP table.

Note that each function of FIG. 2 may be implemented by the software or the hardware. Each function of FIG. 2 may also be implemented by combining the hardware and the software. Respective functional blocks of FIG. 2 have a mutual relationship. The example of the functional arrangement in FIG. 2 is merely an example. The plurality of functional blocks of FIG. 2 may be integrated to form one functional block or any of the functional blocks may further be divided into a plurality of functional blocks.

(Processing Sequence)

Figure 4:
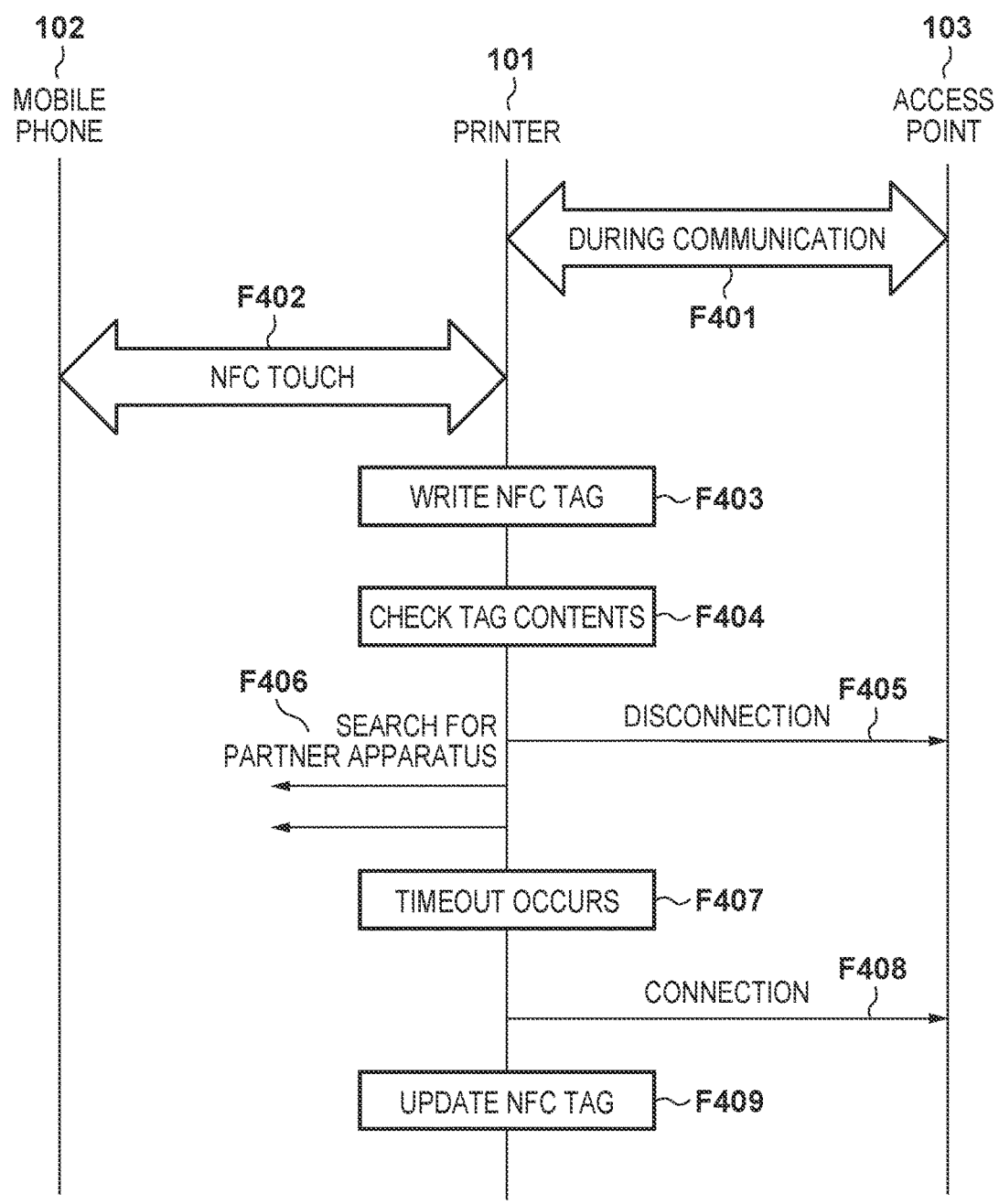
FIG. 4 is a sequence chart showing the first example of a processing sequence executed in the wireless communication system.
Figure 5:
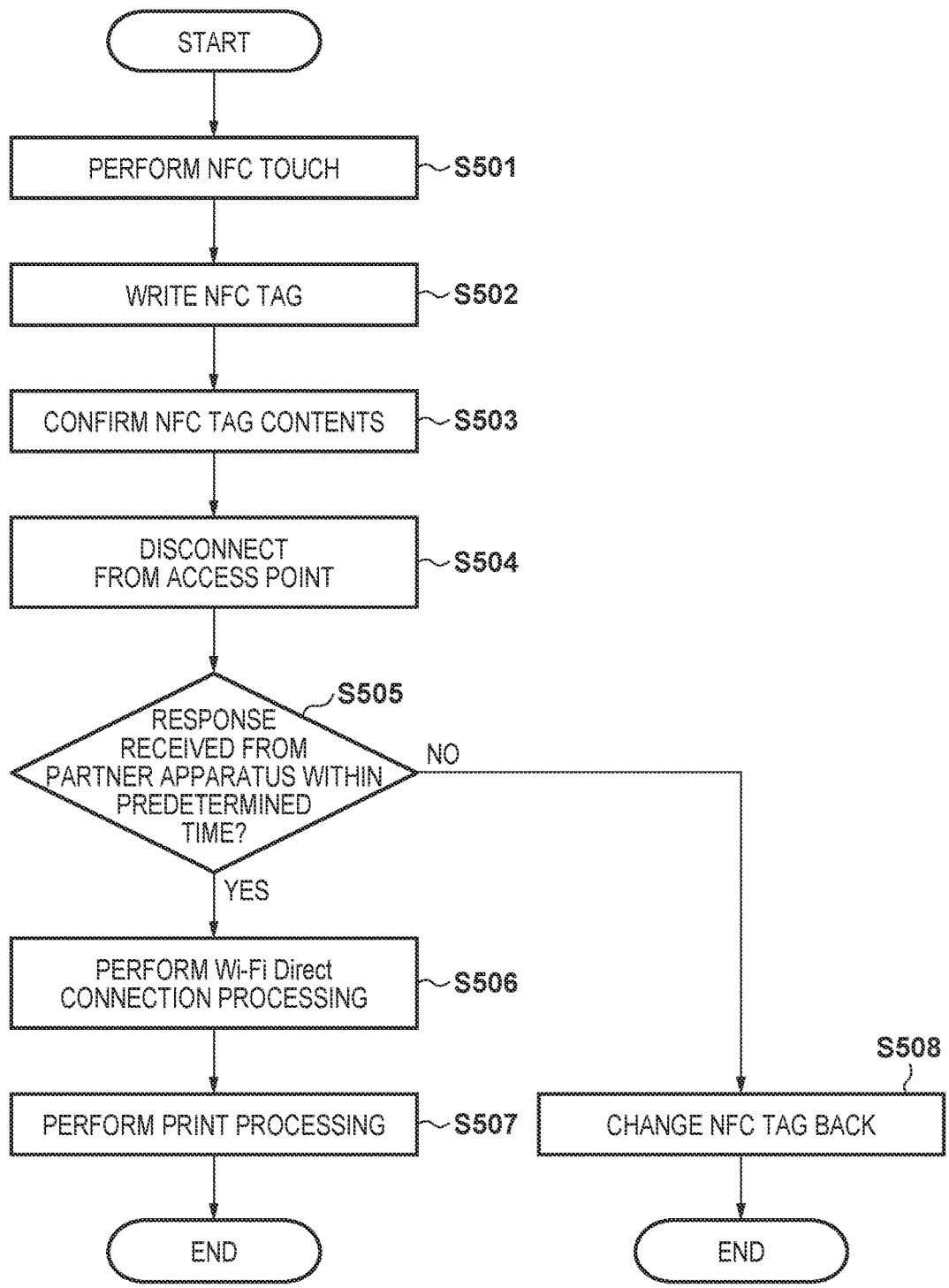
FIG. 5 is a flowchart showing the first example of a processing sequence executed by a printer.

The processing sequence executed by each apparatus described above will now be explained with reference to FIGS. 4 and 5. FIG. 4 is a sequence chart showing an example of the processing sequence executed in the wireless communication system. FIG. 5 is a flowchart showing an example of the processing sequence executed by the printer 101.

In this processing, assume that the printer 101 is in a state in which the printer 101 is joining the wireless LAN network generated by the access point 103 (that is, connecting to the access point 103) (F401). In this state, when the user of the mobile phone 102 moves the mobile phone 102 closer to the printer 101 (touches the printer 101 with the mobile phone 102), communication by NFC is performed between the printer 101 and the mobile phone 102 (F402 and step S501). As a result, the NFC reader/writer unit 302 of the mobile phone 102 writes information on the mobile phone 102 in the NFC tag of the printer 101 by communication according to an NFC standard (F403 and step S502).

Note that the written information can be information capable of specifying at least the mobile phone 102 and can be, for example, identification information capable of identifying the mobile phone 102 such as the MAC address or the UUID of the mobile phone 102. Further, the written information includes a request requesting that the communication between the printer 101 and the mobile phone 102 by the wireless LAN is performed. Note that the written information may contain a communication parameter (information such as SSID, an encryption key, an encryption scheme, an authentication key, or an authentication scheme) for the printer 101 to connect to the mobile phone 102 by the wireless LAN or authentication information such as a PIN code. The communication parameter here may be a communication parameter of a wireless LAN created by the mobile phone 102 when the mobile phone 102 has a wireless LAN access point function. On the other hand, the communication parameter here may be a communication parameter of a wireless LAN to which the mobile phone 102 connects (joins) currently when the mobile phone 102 does not have the wireless LAN access point function. That is, the communication parameter here may be a communication parameter of an external access point.

After that, the printer 101 confirms the information written in the NFC tag of the self apparatus by the mobile phone 102 (F404 and step S503). By this confirmation, the printer 101 can recognize that the mobile phone 102 requires creation of the wireless LAN network between the printer 101 and the mobile phone 102.

Then, the printer 101 leaves the wireless LAN that it is joining currently and is created by the access point 103. That is, the printer 101 disconnects a connection to the access point 103 (F405 and step S504). More specifically, the printer 101 transmits, to the access point 103, a wireless packet including a connection release frame. After that, the printer 101 transmits, to the wireless LAN, a search request packet which contains the information (for example, the identification information such as the MAC address) received from the mobile phone 102 in F402 and waits for a search response from the mobile phone 102 (F406 and step S505). Note that the search request packet is, for example, a probe request and the search response is, for example, a probe response. Here, when the communication parameter such as the SSID is received from the mobile phone 102 by NFC, a search request packet that has designated the SSID may be transmitted. Alternatively, the mobile phone 102 may be searched by transmitting a search request packet which does not contain the information such as the MAC address received from the mobile phone 102 and determining the match between the MAC address received from the mobile phone 102 and an MAC address of the transmission source of the received search response.

Note that the printer 101 may determine whether the self apparatus can perform the AP function and the STA function of the wireless LAN concurrently before disconnecting from the access point 103 (after step S503). That is, the printer 101 creates a new wireless LAN by the AP function and determines whether it can communicate with the mobile phone 102 in the created network while joining the wireless LAN created by the access point 103 with the STA function. Then, if the printer 101 can perform the AP function and the STA function of the wireless LAN concurrently, it may perform the subsequent processing (F406 and step S505) without disconnecting from the access point 103 (by omitting processing in F405 and step S504). On the other hand, if the printer 101 cannot perform the AP function and the STA function of the wireless LAN concurrently, it can perform the subsequent processing (F406 and step S505) after disconnecting from the access point 103 (F405 and step S504).

When the mobile phone 102 does not enable the wireless LAN function, it cannot recognize, even if the printer 101 transmits the search request packet to the wireless LAN (F406 and step S505), the search request packet and cannot return the search response. If the response is not returned from the mobile phone 102 within a predetermined time (NO in step S505), timeout occurs (F407) and the printer 101 terminates search processing. As a result, the printer 101 cannot establish the communication with the mobile phone 102 by the wireless LAN.

After the timeout occurs, the printer 101 transmits a connection request to the access point 103 and resumes the connection to the access point 103 connected before a NFC touch (F408). Note that when the printer 101 attempts to communicate with the mobile phone 102 as the AP while connecting to the access point 103 as the STA, F405 is omitted, eliminating the need for reconnection processing by F407. Upon resuming the connection to the access point 103, the printer 101 then writes the information written in the NFC tag of the self apparatus back to the information before changed by F403 (F409 and step S508). Note that the contents of the NFC tag may be written back before resuming the connection to the access point 103.

Note that if the response is returned from the mobile phone 102 within the predetermined time (YES in step S505), the printer 101 establishes the connection with the mobile phone 102 by the wireless LAN (step S506). Note that a connection between the printer 101 and the mobile phone 102 by the wireless LAN can be established by using, for example, a Wi-Fi Direct® protocol. Then, the printer 101 obtains data to be printed from the mobile phone 102 and performs print processing (step S507). Note that after the end of the print processing, the printer 101 may disconnect from the mobile phone 102 by the wireless LAN, establish the connection with the access point 103 again, and then return the contents of the NFC tag to a state before NFC communication is performed in step S501.

Note that the printer 101 may determine whether the mobile phone 102 can perform communication by the wireless LAN not by whether there has been a response to a search signal but by, for example, the NFC communication. That is, the printer 101 can obtain, from the mobile phone 102, information on whether the communication function of the wireless LAN is in an enabled state or the like by the NFC communication and can determine, based on that information, whether the mobile phone 102 can perform the communication by the wireless LAN. In this case, if the mobile phone 102 cannot perform the communication by the wireless LAN, the printer 101 need not perform even the setting of the wireless LAN for searching for the mobile phone 102. Therefore, the processing becomes simpler and convenience can be improved.

The printer 101 may search for the mobile phone 102 by the wireless LAN in a setting based on the information obtained by the NFC communication with the mobile phone 102 without recording that information in the NFC tag immediately. Then, the printer 101 may write the obtained information in the NFC tag only if the mobile phone 102 is found.

Figure 6:
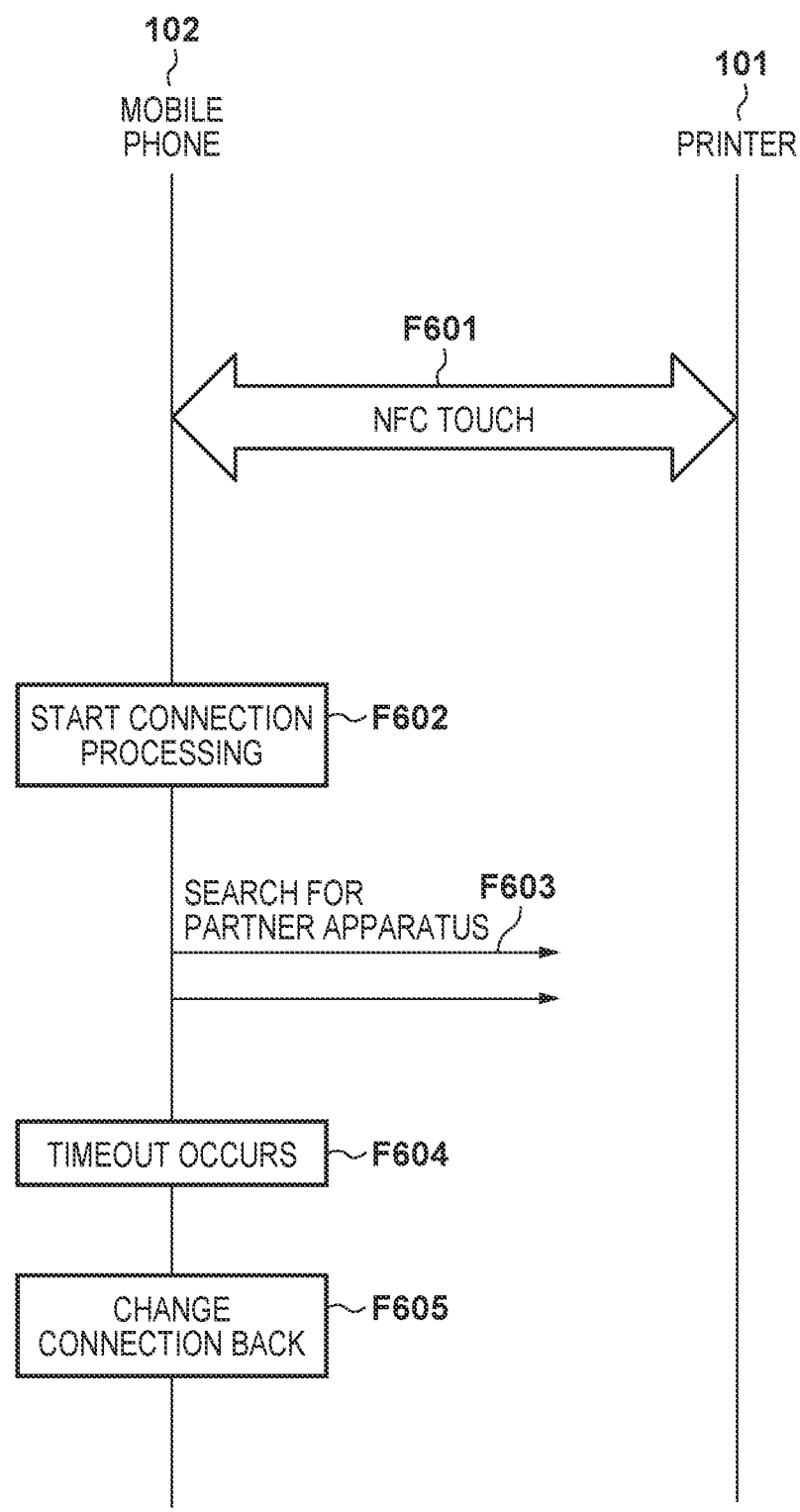
FIG. 6 is a sequence chart showing the second example of a processing sequence executed in the wireless communication system.
Figure 7:
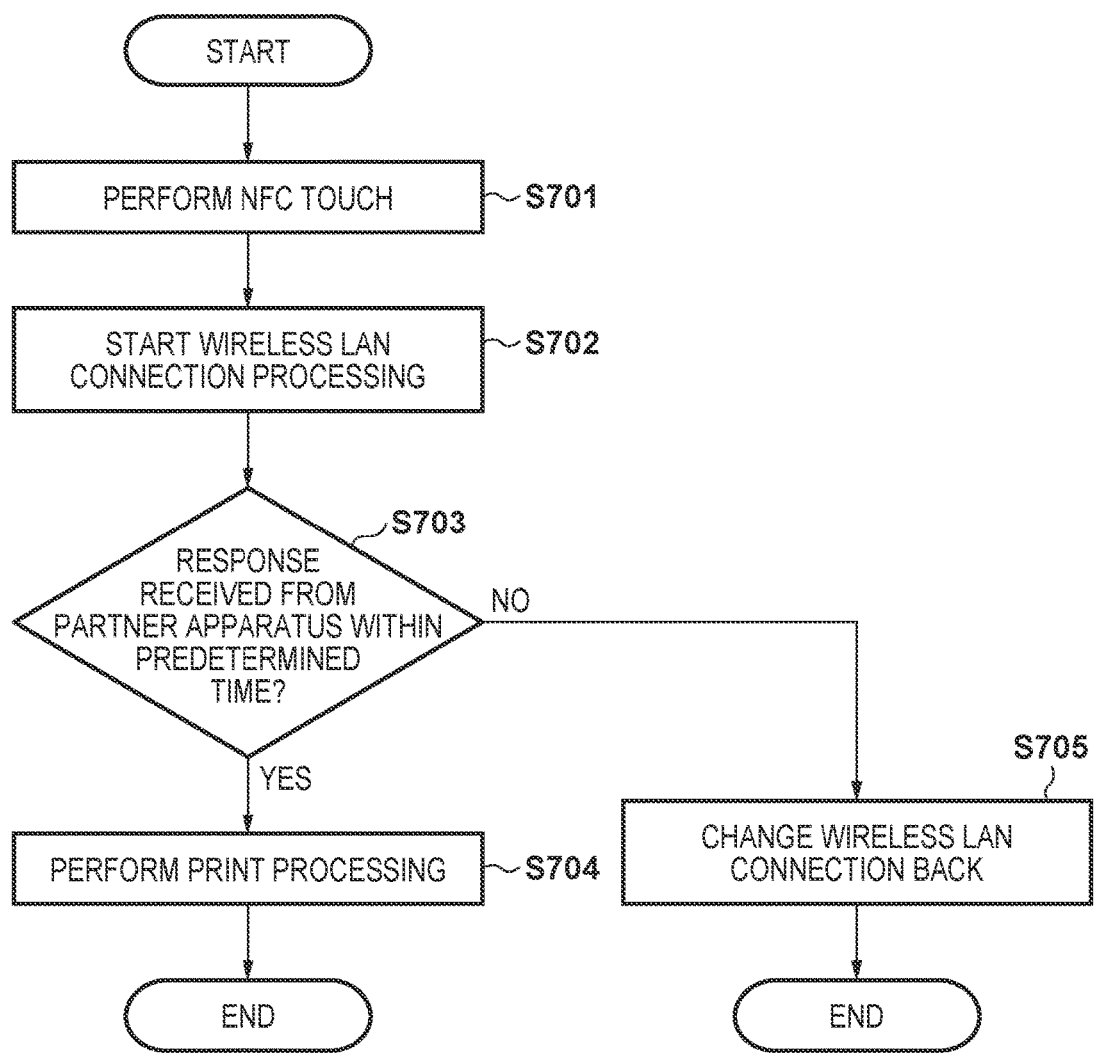
FIG. 7 is a flowchart showing an example of a processing sequence executed by a mobile phone.

The printer 101 performs the above-described processing. However, the mobile phone 102 can also perform the same processing. This will be described with reference to FIGS. 6 and 7. FIG. 6 is a sequence chart showing an example of the processing sequence executed in the wireless communication system. FIG. 7 is a flowchart showing an example of the processing sequence executed by the mobile phone 102.

First, NFC communication between the NFC tag of the printer 101 and the NFC reader/writer of the mobile phone 102 is performed by moving the mobile phone 102 closer to the printer 101 (F601 and step S701). At this time, for example, the NFC reader/writer of the mobile phone 102 provides information for identifying the mobile phone 102 and information indicating that the mobile phone 102 requests communication with the printer 101 by writing them in the NFC tag of the printer 101.

Upon detecting the completion of the NFC communication, the mobile phone 102 then starts connection processing to the printer 101 by the wireless LAN (F602 and step S702). This connection processing is performed, for example, based on the information provided with the printer 101 by the NFC communication and by using the Wi-Fi Direct® protocol. After that, the mobile phone 102 searches for the printer 101 by the wireless LAN (F603 and step S703). Note that, for example, when the printer 101 does not enable the wireless LAN function after the NFC communication, the mobile phone 102 never receives a response to the search from the printer 101 within a predetermined period of time. In this case, therefore, timeout occurs in the mobile phone 102 (F604 and NO in step S703).

If the timeout has occurred, the mobile phone 102 changes the setting of the wireless LAN back to a state before the NFC communication (F605 and step S705). Then, if the mobile phone 102 has connected to another wireless LAN access point or a public network before the NFC communication of F601, it restores that connection state. On the other hand, if the mobile phone 102 has received the response to the search within the predetermined period of time (YES in step S703), it establishes a connection by the wireless LAN and performs print processing (step S704).

Note that the mobile phone 102 may determine whether the printer 101 can perform communication by the wireless LAN not by whether there has been a response to a search signal but by, for example, the NFC communication. That is, the mobile phone 102 can obtain, from the printer 101, information on whether the communication function of the wireless LAN is in an enabled state or the like by the NFC communication and can determine, based on that information, whether the printer 101 can perform the communication by the wireless LAN. In this case, if the printer 101 cannot perform the communication by the wireless LAN, the mobile phone 102 need not perform even the setting of the wireless LAN for searching for the printer 101. Therefore, the processing becomes simpler and convenience can be improved.

As described above, when a wireless LAN connection based on NFC information is not completed, it becomes possible to return the contents of the NFC tag or the setting of the wireless LAN to the state before the NFC communication is performed and to disable the setting for the wireless LAN connection based on that NFC information. This also makes it possible to prevent unnecessary information from being kept stored in the NFC tag.

Second Embodiment

In the first embodiment, the processing has been described in which the printer 101 or the mobile phone 102 determines whether it is possible to communicate with the partner apparatus by the wireless LAN and if it determines that it is not possible, it changes the contents of the NFC tag or the setting of the wireless LAN back to the previous state, or does not perform that setting. In this embodiment, a mobile phone 102 designates a service (process) desired to be performed by NFC communication and a printer 101 determines whether it can handle that service. If the printer 101 cannot provide that service, it does not perform a connection with the mobile phone 102 by a wireless LAN and returns contents of an NFC tag to a state before the NFC communication. On the other hand, if the printer 101 can provide that service, it establishes the connection with the mobile phone 102 by the wireless LAN and provides the designated service. Note that the same processing as in the first embodiment may be performed in establishing the wireless LAN. That is, the printer 101 or the mobile phone 102 may determine whether it is possible to communicate with a partner apparatus by the wireless LAN and if it determines that it is not possible, it changes the contents of the NFC tag or the setting of the wireless LAN back to the previous state, or does not perform that setting.

Figure 8:
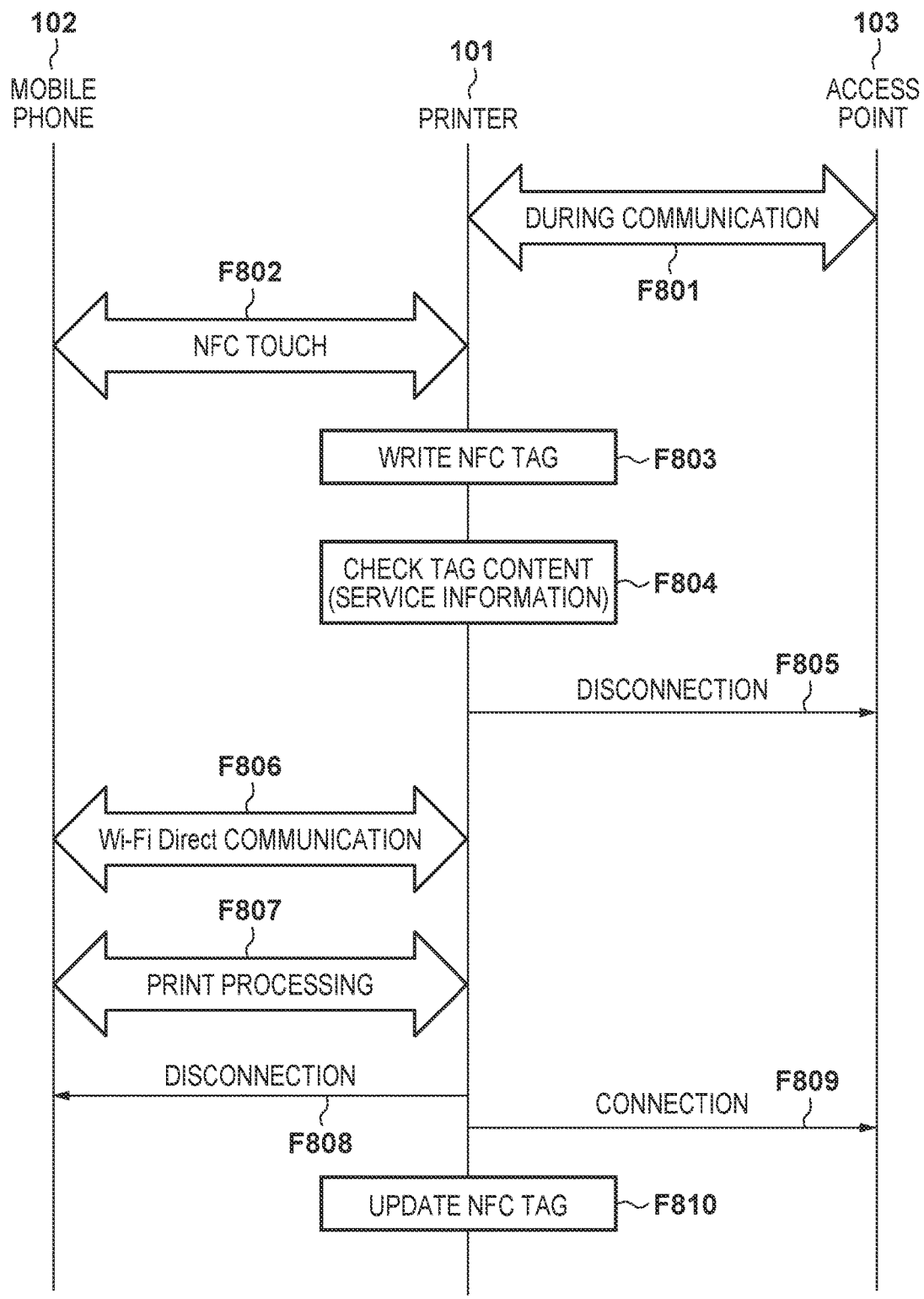
FIG. 8 is a sequence chart showing the third example of a processing sequence executed in a wireless communication system.
Figure 9:
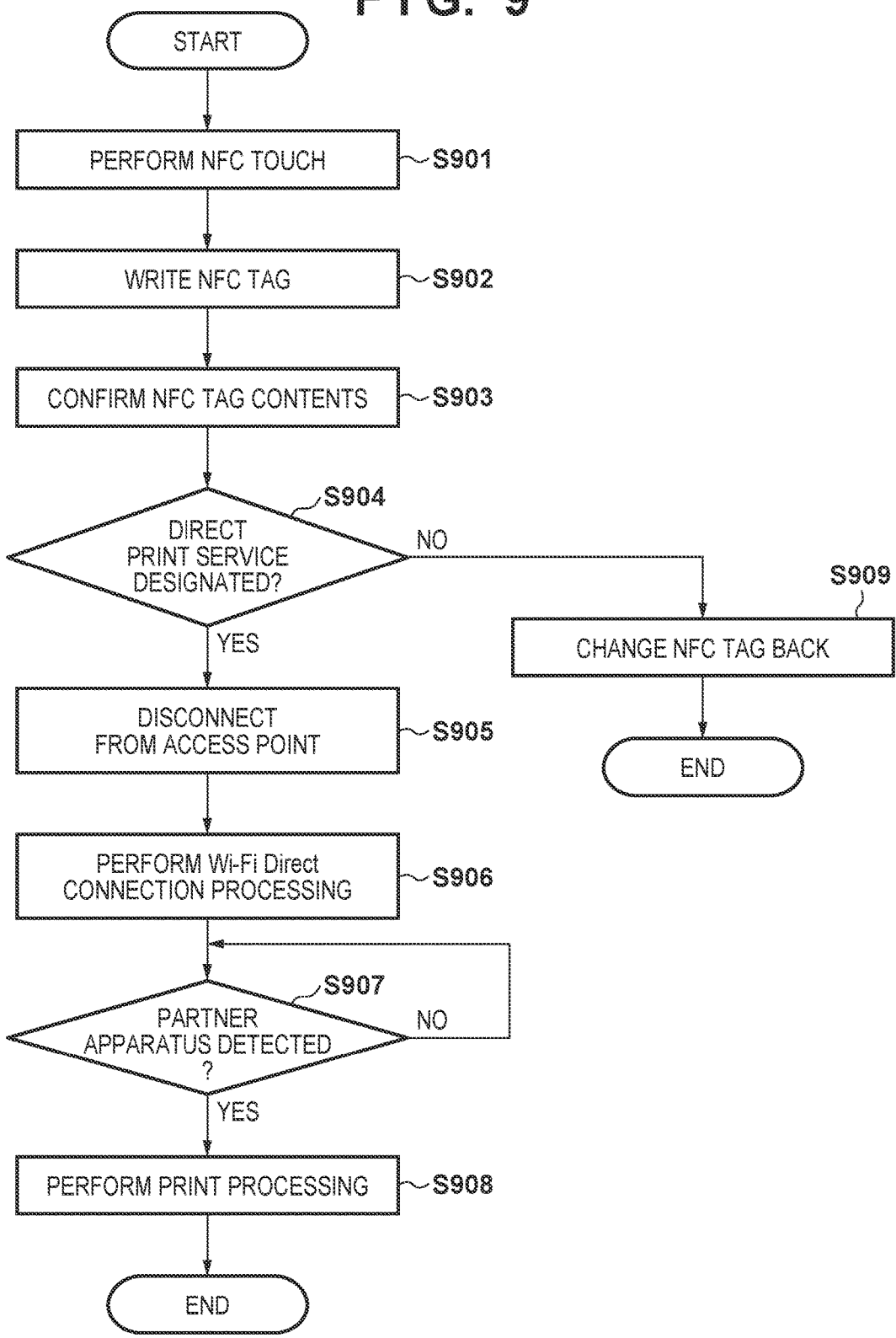
FIG. 9 is a flowchart showing the second example of a processing sequence executed by a printer.

A processing sequence according to this embodiment will be described below with reference to FIGS. 8 and 9. Note that a system arrangement and an apparatus arrangement are the same as in the first embodiment, and thus a description thereof will be omitted. FIG. 8 is a sequence chart showing an example of the processing sequence executed in a wireless communication system. FIG. 9 is a flowchart showing an example of the processing sequence executed by the printer 101. Note that processing in F801 to F803 of FIG. 8 and processing in steps S901 and S902 of FIG. 9 are the same as processing in F401 to F403 of FIG. 4 and processing in steps S501 and S502 of FIG. 5, respectively. Thus, a description thereof will be omitted. However, information written in the NFC tag of the printer 101 by the mobile phone 102 in F803 and step S902 contains information for the mobile phone 102 to designate a service that requires execution.

The printer 101 confirms the contents written from the mobile phone 102 in the NFC tag of the printer 101 (F804 and step S903). The printer 101 confirms the service designated by the mobile phone 102 and confirms whether the printer 101 can execute that service. Note that here, the printer 101 can provide a direct print service and confirms whether the direct print service has been designated by the mobile phone 102 (step S904). Note that confirmation may be made here not of whether the printer 101 can execute the designated service but of whether, for example, the service is a predetermined service that should establish a direct connection between the printer 101 and the mobile phone 102 by the wireless LAN.

If the printer 101 confirms that the direct print service has been designated as a result of confirming the NFC tag (YES in step S904), it disconnects from an access point 103 in a connection state (F805 and step S905). Note that this disconnection processing is the same processing as in F405 of FIG. 4 and step S504 of FIG. 5. If the printer 101 can function as an AP and an STA concurrently, the disconnection processing and reconnection processing (F809) to be described later may not be performed as described above. After that, the printer 101 performs connection processing with the mobile phone 102 by a Wi-Fi Direct® (F806 and step S906) and performs print processing (F807 and step S908). Note that the printer 101 can perform detection and wait processing of the mobile phone 102 after a connection in a wireless LAN link layer by the Wi-Fi Direct® is established (step S907). The printer 101 may shift to F406 and step S505 of FIGS. 4 and 5 after the processing of F805 and step S905, and may perform the subsequent processing in accordance with FIGS. 4 and 5. After the end of the print processing, the printer 101 then disconnects from the mobile phone 102 by the wireless LAN (F808) and establishes the connection with the access point 103 again (F809). After that, the printer 101 returns the contents of the NFC tag to a state before the NFC communication of F802 is performed (F810).

On the other hand, if the direct print service has not been designated as a result of confirming the NFC tag (NO in step S904), the printer 101 does not establish communication with the mobile phone 102 by the wireless LAN. In this case, the printer 101 writes the information written in the NFC tag of a self apparatus back to information before changed by F803 (step S909).

Note that, the printer 101 may determine, based on information obtained by the NFC communication with the mobile phone 102, whether the designated service described above is the service that the printer 101 can handle or the predetermined service without recording that information in the NFC tag immediately, as described above. Then, the printer 101 may write the obtained information in the NFC tag when the designated service is the service that it can handle or the predetermined service by which the direct connection by the wireless LAN is required.

As described above, the printer 101 refers to the information obtained from the mobile phone 102 by the NFC communication and determines whether the service executable by itself has been designated or the predetermined service that should establish the direct connection with the mobile phone 102 by the wireless LAN has been designated. Then, the printer 101 attempts to establish the direct connection with the mobile phone 102 by the wireless LAN when the service executable by itself has been designated or when the predetermined service that should establish the direct connection with the mobile phone 102 by the wireless LAN has been designated. This makes it possible to return the contents of the NFC tag or the setting of the wireless LAN to the state before the NFC communication is performed and to disable the setting for the wireless LAN connection based on that NFC information when the setting of the wireless LAN need not be performed. This also makes it possible to prevent unnecessary information from being kept stored in the NFC tag.

Third Embodiment

In this embodiment, a printer 101 confirms, based on information obtained from a mobile phone 102 by NFC communication, whether the mobile phone 102 currently connects to a wireless LAN to which the printer 101 connects. That is, the printer 101 confirms whether the mobile phone 102 has established a connection, by the wireless LAN, with an access point 103 to which the printer 101 connects. Then, the printer 101 performs connection processing with the mobile phone 102 by the wireless LAN when the mobile phone 102 has not established the connection with the access point 103. On the other hand, the printer 101 communicates with the mobile phone 102 by communication by the wireless LAN via the access point 103 when the mobile phone 102 has established the connection with the access point 103.

Figure 10:
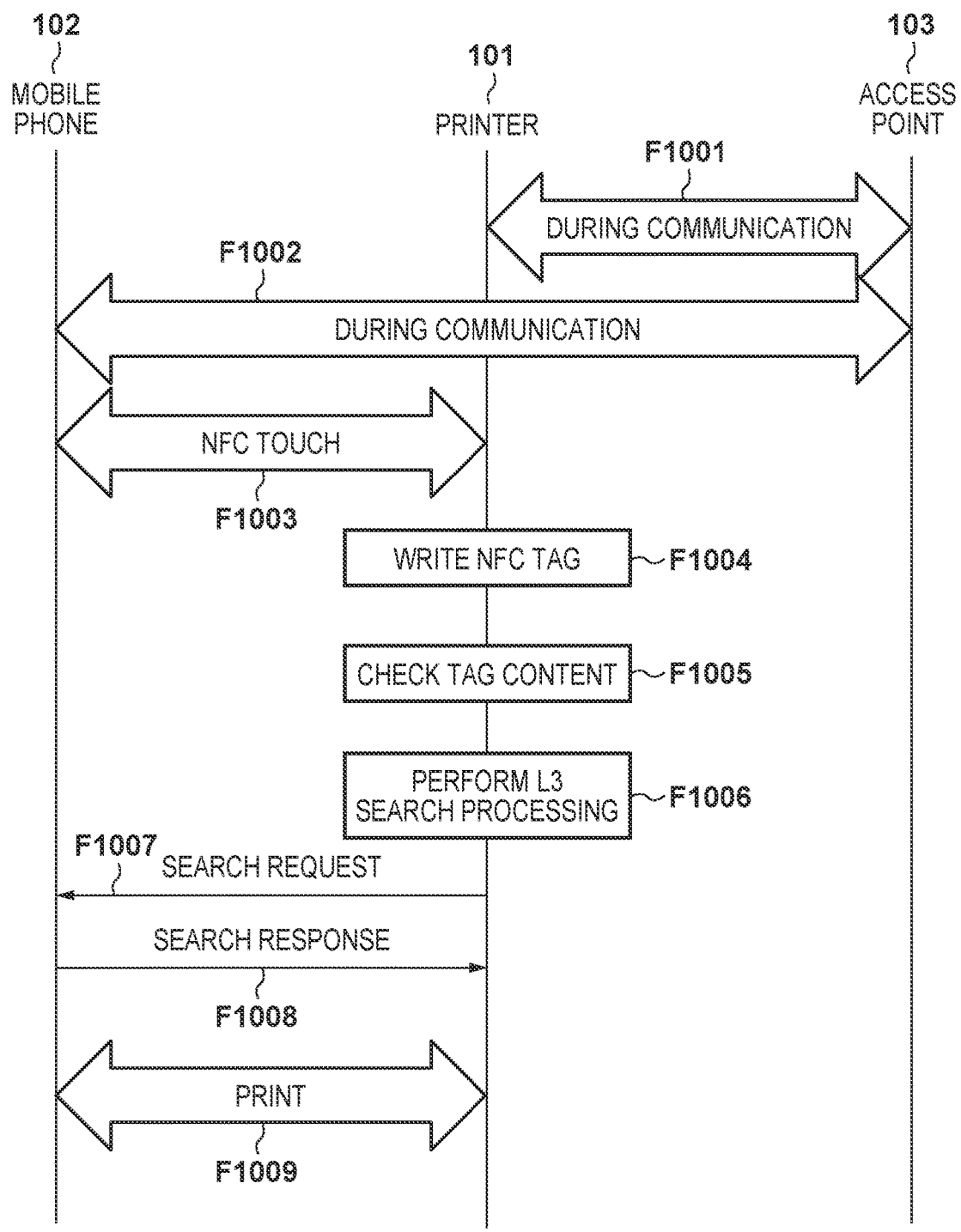
FIG. 10 is a sequence chart showing the fourth example of a processing sequence executed in a wireless communication system.
Figure 11:
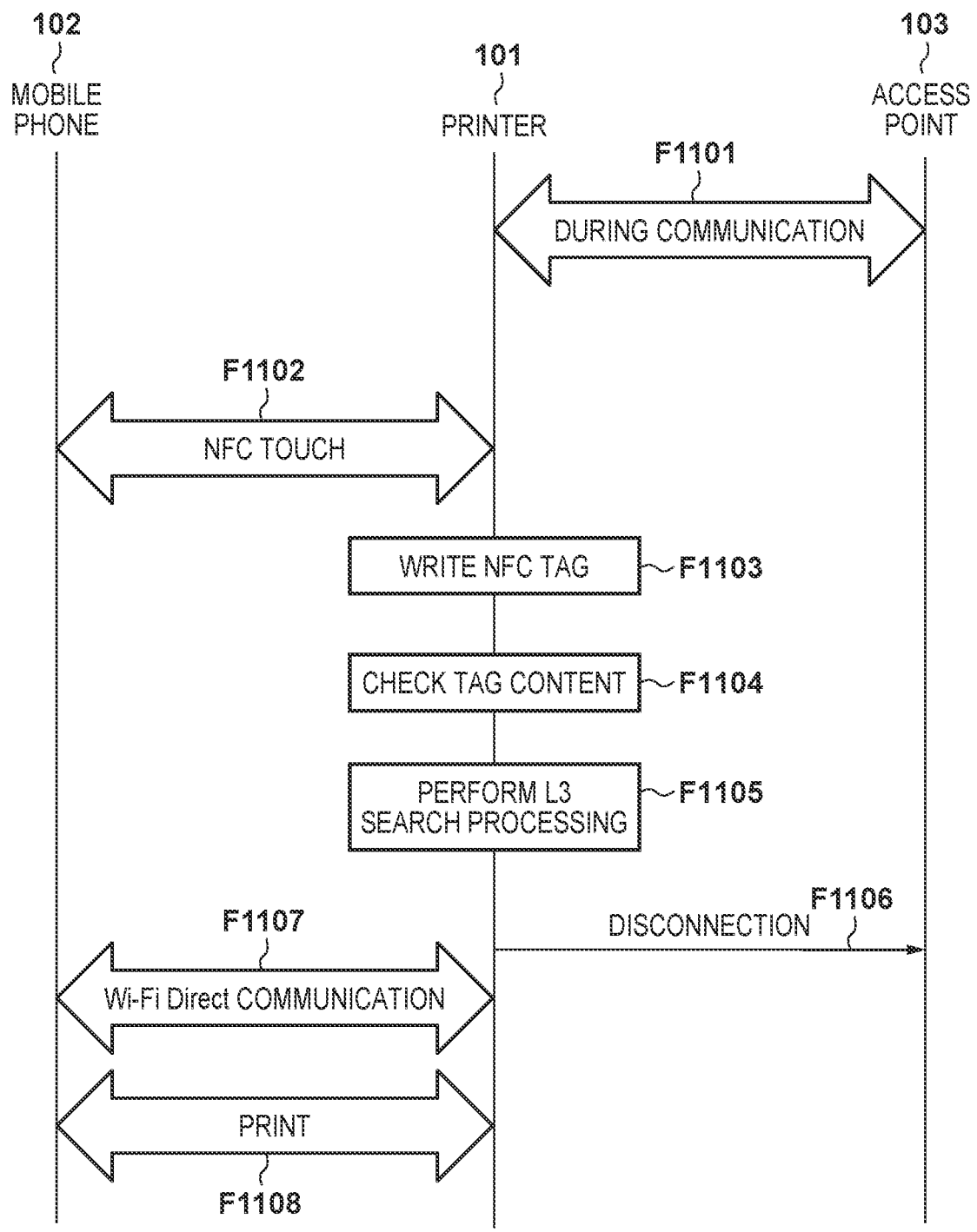
FIG. 11 is a sequence chart showing the fifth example of a processing sequence executed in the wireless communication system.
Figure 12:
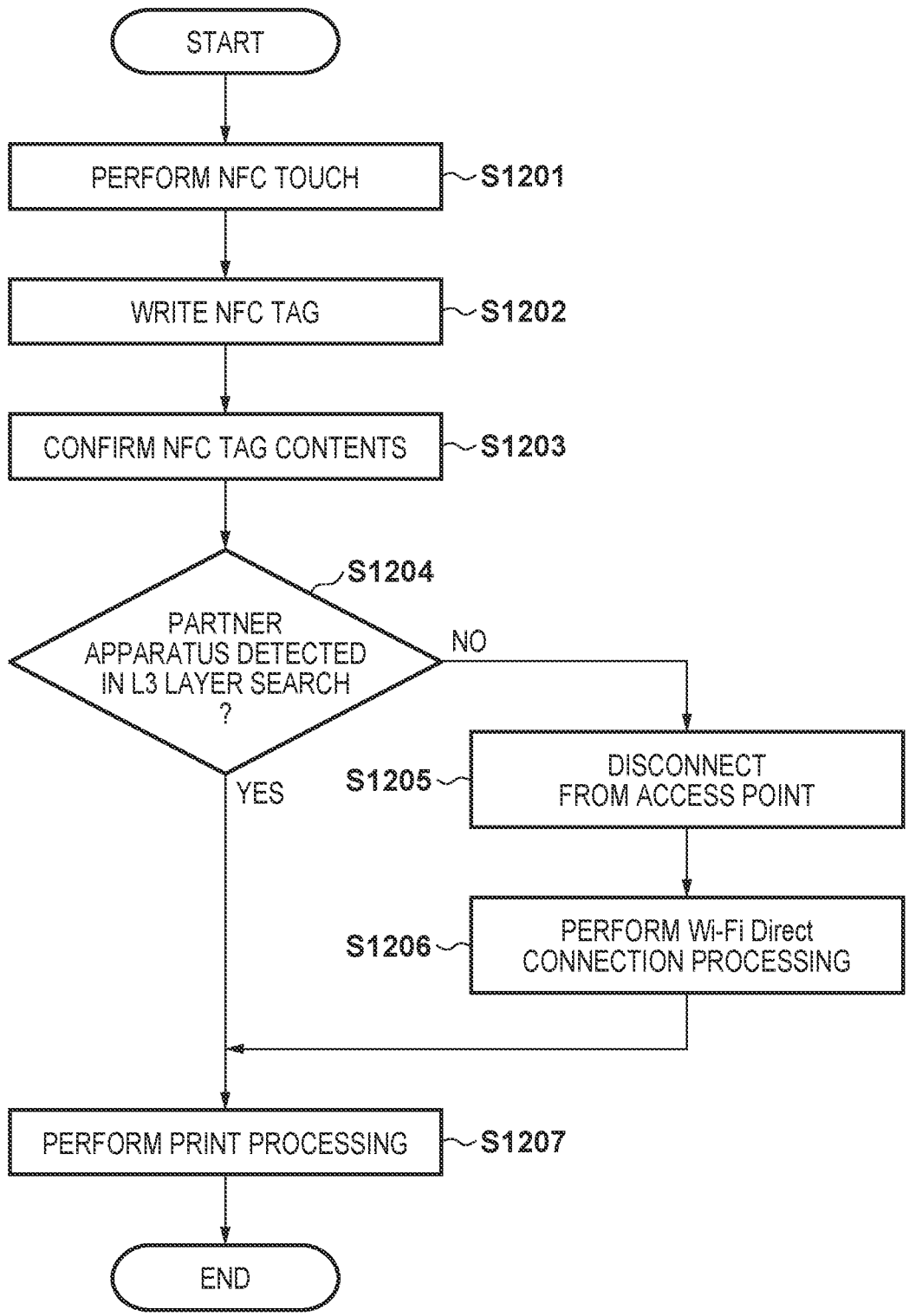
FIG. 12 is a flowchart showing the third example of a processing sequence executed by a printer.

A processing sequence according to this embodiment will be described below with reference to FIGS. 10, 11, and 12. Note that a system arrangement and an apparatus arrangement are the same as in the first and second embodiments, and thus a description thereof will be omitted. Each of FIGS. 10 and 11 is a sequence chart showing an example of the processing sequence executed in a wireless communication system. FIG. 12 is a flowchart showing an example of the processing sequence executed by the printer 101.

First, the example of FIG. 10 will be described with reference to FIGS. 10 and 12. The example of FIG. 10 is an example in which initially, each of the printer 101 and the mobile phone 102 has already established the connection with the access point 103 (F1001 and F1002). First, processing until the mobile phone 102 approaches the printer 101, the NFC communication is performed, and the information obtained by the printer 101 is confirmed (F1003 to F1005 and steps S1201 to S1203) is the same as in the first and second embodiments. Thus, a detailed description thereof will be omitted.

Subsequently, based on information written in an NFC tag, the printer 101 determines, by using service search processing of a layer 3, whether the mobile phone 102 currently connects to a network to which the printer 101 is joined (F1006 and step S1204). Note that the service search processing of the layer 3 can be, for example, UPnP or Multicast DNS. More specifically, the printer 101 transmits a search request for searching for the mobile phone 102 to a network to which it currently connects (F1007). Upon receiving the search request from the printer 101, the mobile phone 102 transmits a search response to the printer 101 (F1008). This allows the printer 101 to find the mobile phone 102 by the service search processing of the layer 3 (YES in step S1204). Subsequently, the printer 101 communicates with the mobile phone 102 and performs print processing (F1009 and step S1207).

FIG. 10 represents that the search request and the search response are directly transmitted/received to/from the printer 101 and the mobile phone 102, for easy understanding. However, the present invention is not limited to this. That is, the printer 101, in practice, transmits a search request which has designated identification information (for example, the MAC address) of the mobile phone 102 to the access point 103 in order to determine whether the mobile phone 102 connects to the access point 103. The access point 103 receives this search request, transfers it to an STA connected to a wireless LAN created by itself, and transfers a response from each STA to the printer 101. Alternatively, identification information (for example, the MAC address) of the STA managed by the access point 103 is compared with the identification information contained in the search request, and that result is transmitted to the printer 101. By those methods, the printer 101 can certainly find the mobile phone 102 as long as the mobile phone 102 has established the connection with the access point 103.

Similarly, FIG. 10 represents that the print processing is performed directly between the printer 101 and the mobile phone 102, for easy understanding. However, the present invention is not limited to this. That is, in this case, both of the printer 101 and the mobile phone 102 exist under the control of the access point 103, and thus an actual packet for printing may be transmitted/received via the access point 103.

The example of FIG. 11 will now be described with reference to FIGS. 11 and 12. The example of FIG. 11 is an example in which initially, while the printer 101 has already established the connection with each access point 103 (F1101), the mobile phone 102 has not established the connection with each access point 103. Processing until F1102 to F1104 is the same as processing until F1103 to F1105 of FIG. 10, and thus a detailed description thereof will be omitted.

In the example of FIG. 11, the printer 101 determines, by using the service search processing of the layer 3, that the mobile phone 102 does not currently connect to the network to which the printer 101 is joined (NO in step S1204). FIG. 11 does not show the search request and the search response shown in FIG. 10. In practice, however, processing is performed in which the printer 101 transmits a search request but does not receive a search response because the mobile phone 102 does not connect to the access point 103.

In this case, the printer 101 transmits a disconnection notification to the access point 103 to disconnect from the access point 103 (F1106 and step S1205), and attempts to establish the direct connection with the mobile phone 102. Note that this disconnection processing is the same as the processing in F405 of FIG. 4 and in step S504 of FIG. 5. If the printer 101 can function as an AP and an STA concurrently, the disconnection processing and reconnection processing to be described later may not be performed as described above. After that, the printer 101 performs connection processing with the mobile phone 102 by a Wi-Fi Direct® (F1107 and step S1206) and performs print processing (F1108 and step S1207).

Note that the printer 101 may shift to F406 and step S505 of FIGS. 4 and 5 after the processing of F1106 and step S1205, and may perform the subsequent processing in accordance with FIGS. 4 and 5. After the end of the print processing, the printer 101 disconnects from the mobile phone 102 by the wireless LAN, establishes the connection with the access point 103 again, and then returns the contents of the NFC tag to a state before the NFC communication in step S1201 is performed.

Note that the printer 101 may determine, based on information obtained by the NFC communication with the mobile phone 102, whether the mobile phone 102 connects to the access point 103 without recording that information in the NFC tag immediately, as described above. Then, the printer 101 may write the obtained information in the NFC tag when the mobile phone 102 connects to the access point 103.

As described above, the printer 101 refers to the information obtained from the mobile phone 102 by the NFC communication and determines whether the mobile phone 102 connects to a network to which the printer 101 connects (that is, the printer 101 connects to the access point 103). Then, the printer 101 performs a process of establishing the connection with the mobile phone 102 by the wireless LAN if it confirms that the mobile phone 102 has not established the connection with the access point 103. This makes it possible to return the contents of the NFC tag or the setting of the wireless LAN to the state before the NFC communication is performed and to disable the setting for the wireless LAN connection based on that NFC information when the setting of the wireless LAN need not be performed again. This also makes it possible to prevent unnecessary information from being kept stored in the NFC tag.

According to the present invention, appropriate communication setting can be performed in accordance with the state of a partner apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-114156, filed Jun. 4, 2015 which is hereby incorporated by reference herein in its entirety.

What is claimed is:

1. A communication apparatus comprising:
a one or more processors; and
a memory including instructions that, when executed by the one or more processors, cause the communication apparatus to function as:
a first communication unit configured to perform short distance wireless communication;
a second communication unit configured to perform communication of a wireless local area network (LAN);
a start unit configured to start the short distance wireless communication with another communication apparatus by the first communication unit while the second communication unit is joining a wireless LAN created by an external access point as a station of the wireless LAN;
a determination unit configured to determine whether the communication apparatus can concurrently perform a station function and an access point function of the wireless LAN in accordance with a start of the short distance wireless communication by the start unit;
a first connection unit configured to directly connect to the another communication apparatus by the wireless LAN by disconnecting from the external access point when the determination unit does not determine that the station function and the access point function can be concurrently performed;
a reconnection unit configured to reconnect to the external access point as the station of the wireless LAN when a connection by the first connection unit fails, wherein the reconnection unit is further configured to reconnect to the external access point as the station of the wireless LAN when the connection by the first connection unit succeeded and wireless communication with the another communication apparatus ended; and
a second connection unit configured to directly connect to the another communication apparatus by the wireless LAN without disconnecting from the external access point when the determination unit determines that the station function and the access point function can be concurrently performed.

2. The apparatus according to claim 1, wherein the first connection unit and the second connection unit are configured to, based on information received from the another communication apparatus by the short distance wireless communication started by the start unit, directly connect to the another communication apparatus by the wireless LAN.

3. The apparatus according to claim 2, wherein the information received from the another communication apparatus by the short distance wireless communication started by the start unit contains identification information of the another communication apparatus.

4. The apparatus according to claim 1, wherein the first connection unit and the second connection unit are configured to directly connect to the another communication apparatus by the wireless LAN by performing an access point function of the communication apparatus.

5. The apparatus according to claim 1, wherein the first connection unit and the second connection unit are configured to directly connect to the another communication apparatus by the wireless LAN using a Wi-Fi Direct® protocol.

6. The apparatus according to claim 1, wherein the short distance wireless communication is short distance wireless communication complying with a Near Field Communication (NFC) standard.

7. The apparatus according to claim 1, wherein the wireless LAN is a wireless LAN complying with an IEEE802.11 standard series.

8. A method for controlling a communication apparatus which includes a first communication unit configured to perform short distance wireless communication and a second communication unit configured to perform communication of a wireless local area network (LANA, the method comprising:

starting the short distance wireless communication with another communication apparatus by the first communication unit while the communication apparatus is joining a wireless LAN created by an external access point as a station of the wireless LAN using the second communication unit;

determining whether the communication apparatus can concurrently perform a station function and an access point function of the wireless LAN in accordance with a start of the short distance wireless communication in the starting;

performing a first connection as direct connection to the another communication apparatus by the wireless LAN by disconnecting from the external access point when it is not determined in the determining that the station function and the access point function can be concurrently performed;

performing reconnection to the external access point as the station of the wireless LAN when a connection in the first connection fails;

performing reconnection to the external access point as the station of the wireless LAN when the connection in the first connection succeeded and wireless communication with the another communication apparatus ended; and performing a second connection as direct connection to the another communication apparatus by the wireless LAN without disconnecting from the external access point when it is determined in the determining that the station function and the access point function can be concurrently performed.

9. A non-transitory computer-readable storage medium storing a computer program for causing a computer which is included in a communication apparatus including a first communication unit configured to perform short distance wireless communication and a second communication unit configured to perform communication of a wireless local area network (LAN) to:

start the short distance wireless communication with another communication apparatus by the first communication unit while the communication apparatus is joining a wireless LAN created by an external access point as a station of the wireless LAN using the second communication unit;

determine whether the communication apparatus can concurrently perform a station function and an access point function of the wireless LAN in accordance with a start of the short distance wireless communication in the starting;

perform a first connection as direct connection to the another communication apparatus by the wireless LAN by disconnecting from the external access point when it is not determined that the station function and the access point function can be concurrently performed;

perform reconnection to the external access point as the station of the wireless LAN when a connection in the first connection fails;

perform reconnection to the external access point as the station of the wireless LAN when the connection in the first connection succeeded and wireless communication with the another communication apparatus ended; and perform a second connection as direct connection to the another communication apparatus by the wireless LAN without disconnecting from the external access point when it is determined that the station function and the access point function can be concurrently performed.

* * * * *